CLAUDE GUILLOT,
INVENTOR 3,527,074
DEVICE FOR REGULATING THE THICKNESS OF ROLLING-MILL PRODUCTS, AND ROLLING MILLS EQUIPPED THEREWITH
Claude Guillot, St. Chamond, France, assignor to Compagnie des Ateliers et Forges de la Loire, St. Chamond, Firminy, St. Etienne, Jacob-Holtzer, and Hydromecanique et Frottement, Paris, France
Filed Nov. 14, 1967, Ser. No. 682,794
Claims priority, application France, Dec. 19, 1966, 87,949
Int. Cl. B21b 37/12
U.S. Cl. 72—8    10 Claims

ABSTRACT OF THE DISCLOSURE

A regulator actuator for rolling mills having a bottomless piston consisting of a main ring provided with suitable packings. A flat cover bears on the ring and contacts the plummer-block. The cover is adapted to move as a consequence of variations in the pressure of a material filling a bore in which the ring is slidably mounted. A plunger piston has one end embedded in such material adapted when sunk more or less in the material to cause movements of the bottomless piston and therefore of the cover. A first means controls the movements of the plunger piston and a second means detects variations in the actual position of the plunger piston. A third means detects variations in the rolling effort during the roll stand operation and a fourth means subordinates the actual position of the plunger piston to its desired position. A fifth means generates a compensator signal corresponding to the desired position.

---

This invention is concerned with means adapted to be incorporated in rolling mills for regulating the thickness of rolling-mill products.

It is advantageous to obtain rolled products having a predetermined and constant thickness. Various devices have already been proposed to achieve this result.

The basic principle on which these known devices are constructed is always the same: to each variation in the rolling effort there corresponds a concomitant variation in the distance between centers of the rolling-mill rolls as a function of the stress applied to the various component elements of the roll stand (it is customary to use the term "rolling-mill yield" to denote the degree of variation in the relative distance between the generatrices of the rolls concerned which was caused by this stress). Therefore, if a constant-thickness product is desired, some means must be provided for controlling the gap of the rolling-mill rolls during the operation (the term "gap" meaning the distance between the rolls under zero rolling pressure conditions).

This implies the combination of different means:

(a) Means for measuring the yield or rolling effort either directly or through the medium of a concomitant magnitude;

(b) Means capable of modifying the gap under load;

(c) Means capable of measuring the gap variations;

(d) Means maintaining the desired relationship between the rolling effort and the gap variation.

Various devices have already been proposed for embodying the above-listed means.

Thus, means capable of modifying the gap under load by rotating adjustment screws have already been proposed, which involved the use of powerful motors; now such motors are objectionable not only on account of their high cost but also of their considerable inertia which prevented the system from modifying the previous adjustment within satisfactory time limits.

Hydraulic actuators of the cylinder-and-piston type have also been used for controlling the gap under load; now although this method is free of the inconveniences characterising screw regulating means, it is attended by other drawbacks, inter alia:

The considerable over-all dimensions involved, which are due not only to the relatively long piston guiding stroke in the cylinder but also to the considerable height of the piston and rod packings;

The high pressure values required which prevent these actuators from attaining a reliable fluid-tightness. These pressures are further more attended by sudden variations or surges putting a severe strain on the lips of the packings (for example when the bloom or ingot is inserted between the rolls of the stand).

As a hydraulic actuator of the above-mentioned type is resilient due to the compressibility of the fluids and to the distortion caused in the packings, the rolling-mill yield and therefore the time required for making the corresponding corrections are increased.

Moreover, the elasticity of this actuator is subject to contingencies such as the frictional contact between the piston and the actuator cylinder bore, the variable configurations assumed by the packings of which the distortion is counteracted by the frictional contacts, the variations in the compressibility of the fluid (due for example to variations in the volume and pressure of this fluid, and also to the quantity of air dissolved therein).

Now the fact of maintaining the rolls of a roll stand at a predetermined distance between centers by using a device of dubious elasticity constitutes an obvious source of inaccuracy.

The rolling effort cannot be measured with precision from the measurement of the fluid pressure, due to the frictions mentioned hereinabove.

On the other hand the plummer-block movements (horizontal movements and lateral tilting movements), produce considerable shocks and strain between the piston and cylinder of said cylindrical actuator, thus reducing the useful life of these parts and also of the packings used therein.

Furthermore the lack of precision of the gap measurement cannot be disregarded due to the undesired movements of the piston in its actuator body which are caused by plummer-block movements (as a matter of fact, the gap measurement is the measurement of the position of the actuator piston in its cylinder).

A third example of the type of devices proposed heretofore consists of a kind of fluid-operated actuator wherein the oil was replaced by a deformable but incompressible material such as rubber, in which a hand-operated screw rod was more or less embedded; however, in this system the above-listed inconveniences of the other two systems were accumulated.

It is an essential object of the present invention to provide a device to be referred to hereinafter as a "thickness regulator", which is capable, in a roll-stand, to modify the gap under load, to measure the gap variations and the rolling effort, to transmit the data corresponding to these measurements in the form of electric signals, to make the incoming and emitted signals responsive to a predetermined law. These different results are obtained with a hitherto unknown degree of precision and quickness of response.

The thickness regulator according to this invention is adapted to be mounted in the uprights of a rolling-mill stand, either between the upright and the bottom plummer-block, or between the screw-down device and the top plummer-block, and is characterised in that it comprises a regulator actuator having a bottomless piston consisting of a ring or annular member provided with packings or like sealing means, a cover bearing on said annular member and contacting the plummer-block, said cover being movable under the influence of variations produced in a material filling the bore in which said ring is disposed; a plunger piston embedded in said material and of which the more or less pronounced engagement in said material controls the movements of said bottomless piston and cover; means for controlling sail plunger piston; means for detecting variations in the position of said plunger piston and therefore in the roll stand gap; means for detecting variations in the rolling effort, which may consist of members responsive to the value of the pressure attained by said material in said bore; other means for subordinating the actual position of said plunger piston to the desired position thereof, and means for generating a compensation signal corresponding to said desired position.

The rolling effort may be found from the value of the pressure produced in said material, but this form of embodiment should not be construed as limiting the invention, since any other suitable means may be used for measuring the rolling effort.

Moreover, the compensator signal may be derived for example from data such as the rolling effort, the gap value, and other data such as the measurement of the thicnkess value of the product, the rolling speed, etc.

According to a typical feature characterising this invention, the ring constituting the bottomless piston of said regulator actuator has its external periphery lined with a suitable plastic material such as loaded or filled "Teflon" enclosed in the space limited at the top by said cover, laterally by a pair of sliding rings bearing against the ring constituting said bottomless piston, and at the bottom by the central portion of said ring.

According to this invention the lateral walls of the sliding rings between which said plastic lining is enclosed are bevelled and these sliding rings bear by means of springs on shoulders formed on the ring constituting the bottomless piston of said regulator actuator.

Still according to this invention, said cover is mounted as a floating member on the material filling the bore of said bottomless piston of the regulator actuator so that only a very slight fraction of the lateral reaction from the plummer-blocks is transmitted therethrough.

According to another feature characterising this invention said cover is connected through the medium of a spring to a distance-piece rigid with said ring constituting the bottomless piston of the regulator actuator.

It is a further feature of this invention that the means controlling said plunger piston consists of a hydraulic actuator of the cylinder-and-piston type operated by a servo-action valve responsive to said means subordinating the actual position of said plunger piston to its desired position.

Also according to this invention said plunger-piston hydraulic control actuator comprises a projecting rod rigid with said plunger piston, the movements of said rod being adapted to be measured by a pick-up unit detecting the position of said plunger piston. This pick-up unit constitutes one of the means provided for subordinating the plunger piston position to its desired position.

According to a further feature characterising this invention of which the pressure variations cause the movements of said bottomless piston of said regulator actuator is selected to have a zero or substantially zero compressibility and a viscosity such that in a duct having the magnitude of the space provided by the clearance between the ring constituting the bottomless piston of said regulator actuator and the bore in which said bottomless piston is adapted to move, the pressures are transmitted with a certain time-lag, these pressures being transmitted nearly instantaneously in ducts of greater cross-sectional dimensions.

Other features and advantages of this invention will appear as the following description proceeds with reference to the attached drawings illustrating diagrammatically by way of example a typical form of embodiment thereof. In the drawings.

Figure 2:
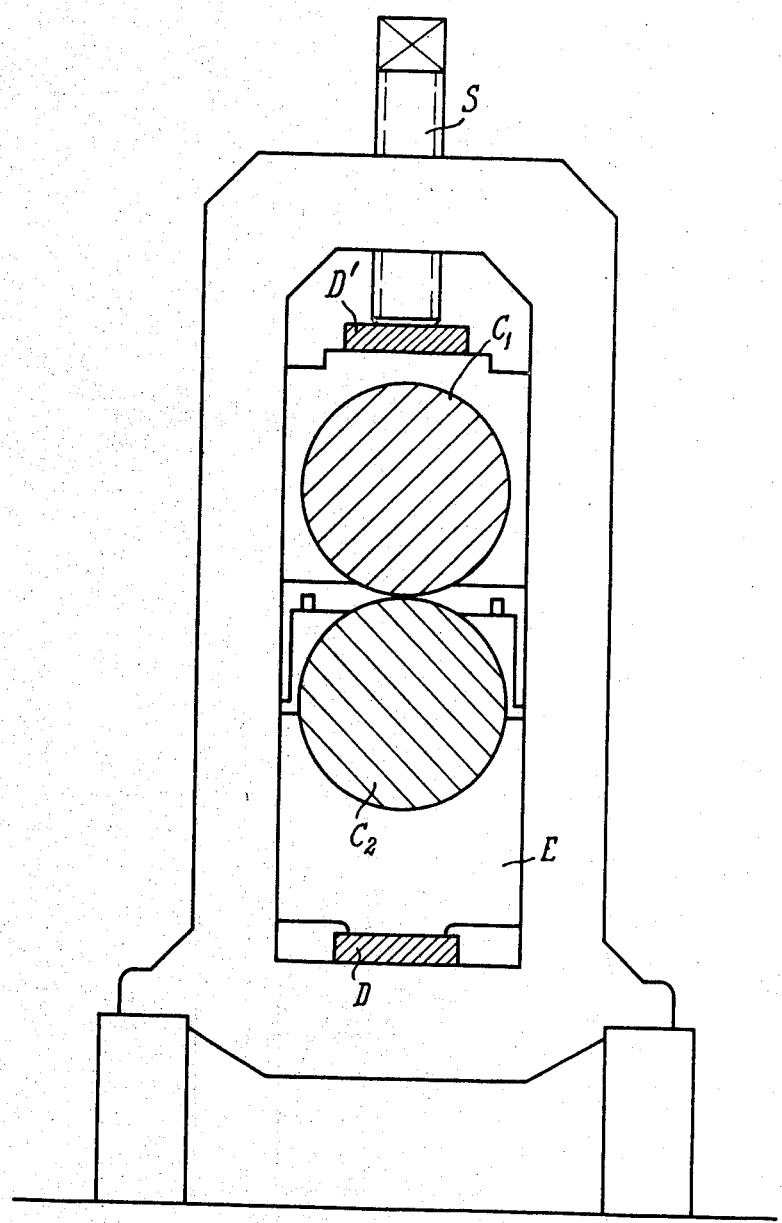
FIG. 2 shows diagrammatically in side elevational view two different ways of mounting the device of this invention in a roll stand.

Two different manners of mounting the regulator of this invention on a roll stand are illustrated diagrammatically in FIG. 2; the thickness regulator can be mounted either at D, beneath the bottom plummer-block E, or at D' beneath the screw-down device S of the roll stand.

Figure 1:
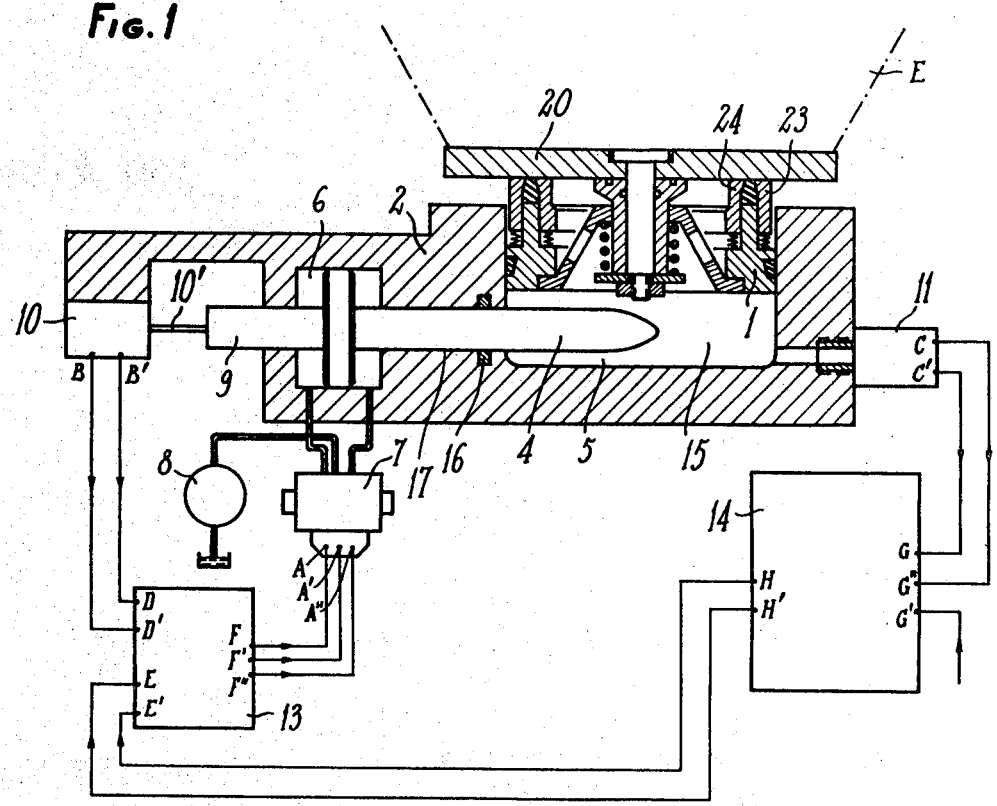
FIG. 1 illustrates in section a thickness regulator constructed according to this invention. The wiring diagram of the electrical control means associated with the regulator is reproduced in order to afford a clearer understanding of the mode of operation of the assembly.
Figure 3:
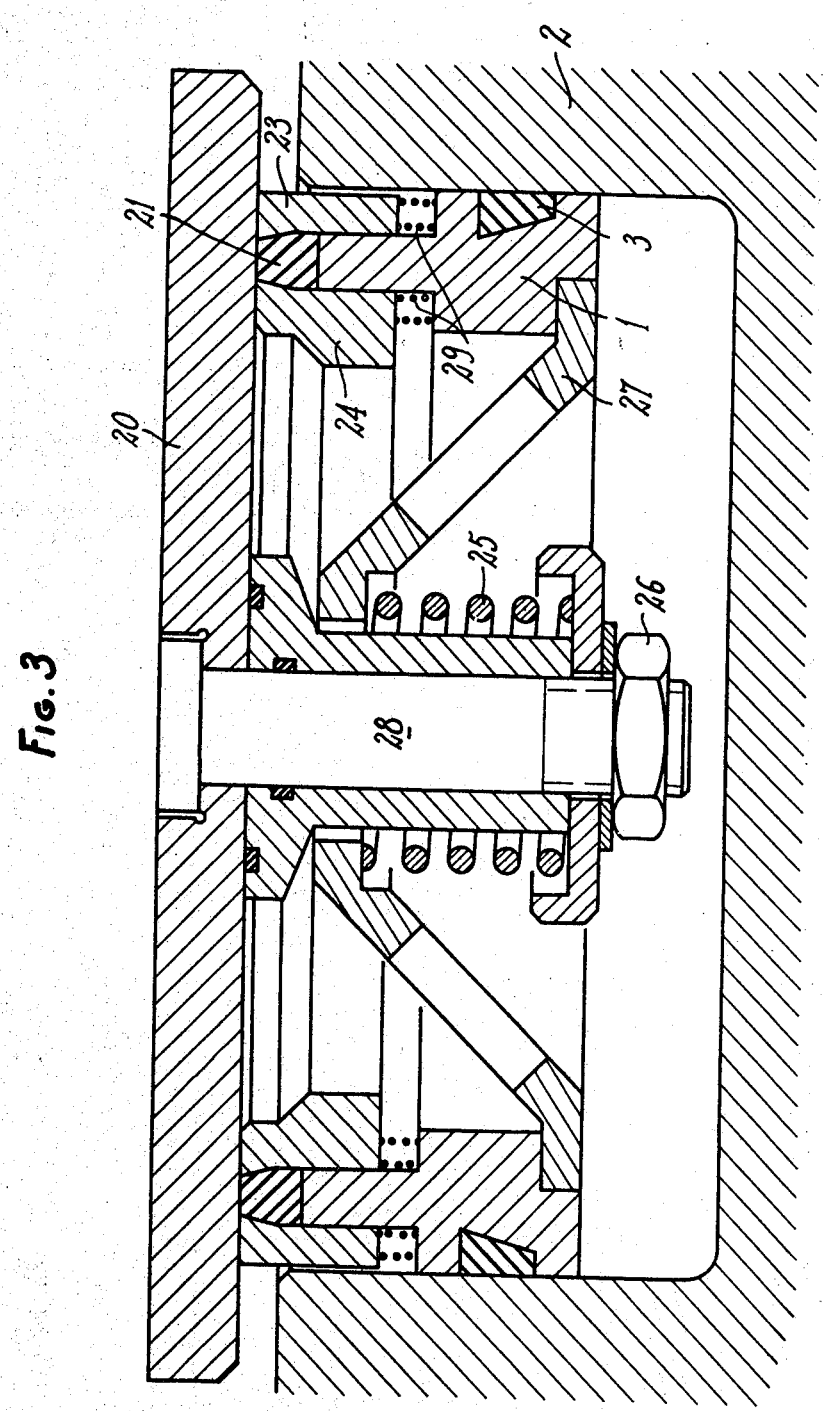
FIG. 3 shows in section and on a large scale a detail of the device of FIG. 1.

Referring to FIGS. 1 and 3 of the drawings it will be seen that the thickness regulator of this invention comprises essentially a regulator actuator of which the original feature resides in a bottomless piston. This bottomless piston 1 is fitted in the bore 15 of actuator body 2 and the plummer-block E is acted upon directly by the material filling the bore 15 through the medium of a cover 20 overlying said piston 1.

This ring piston 1 consists (see FIGS. 1 and 3) of a ring provided with rings 3 and 21 of packing material disposed between its outer periphery and the bore of body 2 and between its upper face and the bearing surface of cover 20, respectively.

The function of this cover 20 is to isolate and protect the material filling the bore 15 when the plummer-block E is removed for dismantling the cylinders. To this end the cover 20 is connected through a spring mounting 25, a screw rod 28 and a nut 26 to a distance-piece 27 rigid with the lower inner periphery of piston 1.

The packing 21 of piston 1 consists of suitable plastic material such as loaded "Teflon" and is enclosed in the space limited at the top by the cover 20, laterally by a pair of sliding rings 23 and 24, and at the bottom by the central portion of ring piston 1. Experience teaches that with this arrangement an adequate fluid-tightness in a plane is obtained, the pressure produced in the material filling the bore 15 by the mill operation causing the ring piston 1 to sink like a piston and compress the packing 21 against the pace of cover 20. The applicants observed that particularly interesting results could be obtained by bevelling the upper edges of sliding rings 23 and 24, the continuity between these rings being ensured by springs 29 reacting against shoulders provided to this end on the main ring piston 1.

Since the whole of the load caused by the rolling effort is thus caused to "float" on the material filling the bore 15, when a lateral movement of plummer-block E takes place this block carries along the cover 20, but as the latter is also floating on the material filling the bore 15 it transmits but a very slight reaction to the main ring piston 1, and as the frictional contact between this ring 1 and the bore is reduced to a minimum it will not interfere with the measurement of the rolling effort from the measurement of the pressure produced within the material filling the bore 15, according to a specific feature of this invention which will be explained presently.

Slidably fitted in a bore 17 of said body 2 is a piston 4 to be referred to hereinafter as the "plunger piston". Packings such as 16 seal the joint between this piston 4 and the body 2.

The deformable space limited by the surfaces of ring 1, cover 20, body 2 and plunger piston 4 is filled with a material 5 having original rheological properties and of which the composition will be set forth presently.

The means provided for controlling the position of plunger piston 4 consist of a hydraulic actuator 6 of the cylinder-and-piston type fed from a suitable source 8 of fluid under pressure which is responsive to a servo-action valve 7, said actuator 6 and servo-action valve 7 being designed to minimize the response time.

The hydraulic actuator 6 controlling the movements of plunger piston 4 is provided to this end with a projecting piston rod 9 rigid with the plunger piston 4. The position of rod 9 and therefore of plunger piston 4 is measured by a pick-up unit or like detector 10 comprising a pin 10' solid with said rod 9.

The pressure produced within the material 5, that is, the rolling effort and consequently the yield, is measured by another pick-up unit or detector 11.

The reference symbols A, A,' A''; B, B'; C, C' denote the electrical wiring connections respectively of servo-action valve 7, pick-up unit 10 for detecting the movements of plunger piston 4, and pick-up unit 11 for detecting the pressure developed within the material 5; besides, D, D'; E, E' and F, F', F'' designate the wiring connections of a position-responsive servo-action unit 13, and finally H, H'; G, G', G'' denote the wiring connections of a circuit adapted to deliver a signal corresponding to the necessary compensation of the rolling effort and therefore of the roll-stand yield. This last-mentioned equipment (i.e. servo-action unit 13 and compensator) will be described presently.

The above-described regulator device of this invention operates as follows:

The principle of operation of the thickness regulator is such that when, as a consequence of an impulse received from a suitable pick-up device or detector unit, the servo-action valve 7 feeds the hydraulic actuator 6 with pressure fluid, the plunger piston 4 is moved; as a result, a pressure variation takes place within the material 5 and thus the regulator actuator piston consisting of the main ring piston 1 is moved together with the cover 20, whereby the gap of the rolling cylinders is modified.

The manner of selecting a detector and apparatus capable of producing the impulse for so controlling the servo-action valve 7 that the thickness of the product delivered from the roll stand be independent of the heterogeneous nature of the product upstream of the same roll stand will now be explained by way of example.

To simplify the disclosure it will be assumed that:

(1) The hydraulic fluid output delivered by the servo-action-valve 7 to control actuator 6 is proportional in both magnitude and sign to the electric voltage available across the terminals A, A', A'' of this servo-action valve (or to the current intensity, or to any other adequate magnitude, according to the particular nature of this servo-action valve).

(2) The electric voltage (or any other suitable magnitude as explained in paragraph (1) hereinabove) across terminals B, B' of the displacement pick-up unit 10 is proportional to the position of piston rod 9 expressed in relation to a certain origin.

(3) The electric voltage (or any other suitable magnitude) available across the terminals C, C' of pressure cylinder 11 is proportional to the pressure existing within the material 5.

Experience teaches that this pressure is proportional in turn to the rolling effort and therefore, at least as a first approximation, to the roll stand yield.

The electronic equipment provided in this example comprises:

(a) Means for controlling the position of plunger piston 4 as detected by the pick-up unit 10 (terminals B, B') shown diagrammatically in the drawing as a block 13. This block designates an equipment which, having received at a first set of terminals D, D' a signal denoting the momentary position of the movable member to be controlled (in this case the plunger piston 4), and, at a second set of terminals E, E', a signal referred as the "rated signal" corresponding to the desired position of said movable member, is adapted to deliver an output signal collected across terminals F, F', F'', capable of modifying the condition of the control member, i.e. the actuator 6 in this case, by operating the servo-action valve 7 in such a manner that the position of said movable member, i.e. the plunger piston 4, is changed to the desired position.

(b) A circuit for producing the compensator signal, which is shown in block form at 14 in the drawing. In the specific form of embodiment of the invention which is illustrated herein by way of example this circuit consists of an add-on adjustable-gain operational amplifier. This term denotes an apparatus receiving a plurality of signals $a, b, c,$ at its input terminals and delivering an output signal proportional to the quantity 1. $a+m.b.+n.c+ \ldots$ ; $l, m, n$ denoting algebraic constants depending on the constructional characteristics of the apparatus.

In this specific example the amplifier 14 receives across its input terminals G, G'' a signal corresponding to the pressure produced within the material 5, as picked up or detected by the unit 11, a zero-shift signal being applied if desired across its terminals G' and G''.

The amplifier 14 delivers at its output terminals H, H' a signal proportional, except if desired for a constant, to the pressure prevailing in said material 5 and therefore to the rolling effort and eventually to the roll-stand yield.

It will be seen that given a proper selection of the coefficient of proportionality and a suitable direction of the wiring connections, this signal may actually be equal to the amount by which the value of the signal controlling the position of the servo-action unit 13 has to be modified for moving the plunger piston 4 and therefore produce a change in the gap which is just equal to said yield, save for a constant.

Therefore, by connecting the output H, H' of amplifier 14 to the input E, E' of servo-action unit 13, and by properly adjusting the gain of amplifier 14, any variation in the rolling effort is attended instantaneously, via the pressure pick-up unit 11, amplifier 14, servo-action unit 13, servo-valve 7 and actuator 6, by a gap variation just equal to the yield variation, so that the distance between the active generatrices of the roll-stand cylinders remains unchanged and the thickness of the product issuing therefrom remains constant.

The principle of the automatic and continuous thickness regulator according to the present invention as described hereinabove, and the mode of operation thereof, are truly original and lead to novel effects; in fact, this device combines an actuator filling material having original rheological properties with a bottomless piston cover of this actuator for producing the following novel effects:

(i) The fluid-tightness is complete and the distortion to which the packings may be submitted as a consequence of peak surges in the pressure prevailing in the material filling said space is nearly zero; under these conditions, the volume of said space remains strictly constant and the position of plunger piston 4 shows very exactly the height of piston 1 and plummer block E.

(ii) The rolling effort can be read with the maximum precision at any time from the measurement of the pressure prevailing in the material 5, since no stray friction takes place, for example between the cylinder and piston.

(iii) As a corollary, a strict faultless control is constantly exerted on both the rolling effort and the yield value.

An exemplary form of embodiment of the cover 20 associated with the bottomless piston consisting of ring 1 is shown in FIG. 3 of the attached drawings. Of course, it will be readily apparent to anybody conversant with the art that any other member capable of urging a flat face against the ring 1 and the above-mentioned filling material 5, so as to constantly urge said face against said material for example by means of a spring of the like, may be substituted for said cover.

The second means contemplated is the material filling the deformable space limited by the surfaces of members 1, 2, 4 and 20. This material must have the following properties:

(I) A perfect fluidity (i.e. the ability to transmit pressure) when spaced sufficiently from the walls, on the one hand for enabling the pressure detector or pick-up unit 11 contacting this material to give information independent of its orientation and position, this information providing a clear indication of the effort exerted on the cover 20, and on the other hand, in case of sudden withdrawal of plunger piston 4 during the regulation, the space from which this plunger piston 4 is removed must be filled almost instantaneously with said material.

(II) Its compressibility rate must be as low as possible (at least 10 times lower than that of a conventional hydraulic transmission oil in the case of the aforesaid material), so that the volume of the space filled by this material remains constant irrespective of the pressure variations occurring therein.

(III) The viscosity of this material must be high enough to definitely prevent or at least strongly damp out and sudden pressure transmission from the space provided between the piston 1 and its bore in body 2 to the seal or packing. This requirement is obvious for if sudden pressure variations were capable of causing a more or less pronounced distortion of the seal or packing, this would detrimentally affect the volume of said space.

(IV) On the other hand, this viscosity should not impair the fluid-tightness, for its is known that conventional sealing means are inadequate for preventing leakages when high-viscosity fluids are used, and any leakage would likewise bring about a detrimental change in the volume occupied by said space.

Now no conventional or known substance is capable of meeting all the above-limited requirements of the above defined material of the present invention, due to its multiple and contradictory properties; however, this material can be obtained by mixing different substances.

A typical, exemplary and non-limiting example of the material according to this invention is obtained by mixing together:

200 parts by weight of calcium-soap grease,
100 parts by weight of micron-size graphite,
20 parts by weight of sodium tri-stearate.

Experience teaches that with this material, mixed in the heated state by using a water bath, a material is obtained which has exactly the above-defined requisite properties.

With this material and a cover connected by spring means to the lower portion of ring 1, a thickness regulator was constructed according to the teachings of this invention; the piston 1 of this regulator had a diameter of 190 mm. and a rated pressure of up to 400 bars or 5,800 p.s.i.; embedded in the actuator filling material 5 was a pressure pick-up unit, the plunger piston had a diameter of 30 mm. and a stroke of 20 mm., the actuator 6 being controlled by a servo-action valve. The correction amplitude was ±0.25 mm. or .01", and by using a suitable electron servo unit, metal sheets having a constant thickness of ±0.01 mm. or .004" were obtained with a response time of less than 0.05 sec.

Moreover, 3,000,000 corrections under maximum amplitude conditions were made without recording any packing wear or diaphragm rupture.

It would not constitute a departure from the present invention to use a plurality of plunger pistons 4 in the regulator described herein.

Thus, a second plunger piston may be mounted for safety reasons, this additional or emergency piston being forced out by the material in case the rolling effort attained excessive values.

The applicants further found, quite unexpectedly, that the above-described device could be used for measuring an effort by measuring the pressure obtaining in the material filling the bore 15 of the regulator actuator, due notably to the perfect fluid-tightness of this actuator.

As a result and as will be readily apparent from the above description and the appended drawings, an apparatus capable of measuring such efforts may be used which comprises essentially an actuator body 2, a main ring 1 slidably mounted in said body, a cover bearing on said ring, packing means between the ring and the actuator body, a material filling the space available between the actuator body, the ring and the cover; the efforts are measured by the pick-up unit 11, this measuring operation being facilitated by the complete fluid-tightness of this actuator and by the absence of reactions between the ring 1 and the body 2.

Of course, many modifications and variations may be resorted to in the practical embodiment of this invention, in comparison with the forms of embodiment shown, described and suggested herein, without inasmuch departing from the spirit and scope of the invention as set forth in the appended claims.

What is claimed is:

1. A regulator device for the thickness of a rolled product located in the stand of a rolling mill having a plummer-block comprising a body, a jack regulator in said body having a piston whose bottom is formed as a ring, a bore in said body for said piston filled with grease, airtight joints between said body and said ring, a cover supported on said joints in contact with said plummer-block, said cover being displaced under the effect of variations of pressure of said grease, a plunger piston in said body extending into said grease whose entrance and retreat therefrom brings about displacements of said ring and said cover, a hydraulic jack actuated by a servovalve controlling said plunger piston, a detector of the variations of the position of said plunger piston and consequently of the variations of the gap of said rolling mill, means collecting the value of the pressure of said grease in said bore and therefore the variations of the rolling effort, means for bringing the real position of said plunger piston to a desired position and means for providing a compensation signal defining said desired position.

2. A device as set forth in claim 1, wherein said regulator is mounted between said stand and the lower plummer-block.

3. A device as set forth in claim 1, wherein said regulator is mounted between the screwdown device and the upper plummer-block.

4. A device as set forth in claim 1, wherein said jack regulator has upon its upper periphery a plastic packing material enclosed in the space limited at its top by said cover and laterally by a pair of sliding rings bearing upon said ring of said piston and at the base by the central portion of said ring.

5. A device as set forth in claim 4 wherein shoulders are provided on said ring, and the lateral walls of said sliding rings, which enclose said plastic packing, are bevelled and said sliding rings bear through the medium of springs on said shoulders.

6. A device as set forth in claim 1 wherein said cover is mounted as a floating member on the material filling said bore of the regulator actuator so it can transmit but a very small fraction of the lateral reactions of said plummer-block.

7. A device as set forth in claim 1 wherein said cover is connected to an intermediate element of said ring by means of a spring.

8. A device as set forth in claim 1 wherein said servovalve is controlled by said means for bringing the real position of said plunger piston to a desired position.

9. A device as set forth in claim 1 in which said hydraulic jack comprises a rod integral with said plunger piston whose displacements are measured by said detector.

10. A device as set forth in claim 1 wherein said grease is formed by a mixture carried out in a hot bath consisting of 200 parts by weight of calcium-soap grease, 100 parts by weight of graphite having a particle size of the order of 1 micron, and 20 parts by weight of sodium tri-stearate.

References Cited
UNITED STATES PATENTS

| | | | |
|---|---|---|---|
| 3,286,495 | 11/1966 | Diolot | 72—8 |
| 3,327,508 | 6/1967 | Brown | 72—245 X |
| 3,389,588 | 6/1968 | Reinhardt et al. | 72—245 |

MILTON S. MEHR, Primary Examiner

U.S. Cl. X.R.

72—245